United States Patent [19]

Heyer

[11] Patent Number: 4,783,304

[45] Date of Patent: Nov. 8, 1988

[54] VACUUM PINNING PROCESS

[75] Inventor: David E. Heyer, Circleville, Ohio

[73] Assignee: E. I. Du Pont de Nemours and Company, Wilmington, Del.

[21] Appl. No.: 63,217

[22] Filed: Jun. 17, 1987

[51] Int. Cl.$^4$ ............................................. B29C 39/42
[52] U.S. Cl. .................................. 264/556; 264/216; 264/237; 264/348; 425/66; 425/224; 425/326.1
[58] Field of Search ............... 264/556, 216, 169, 237, 264/348, 500, 555; 425/66, 224, 388, 326.

[56] References Cited

U.S. PATENT DOCUMENTS

| | | | |
|---|---|---|---|
| 2,212,770 | 8/1940 | Foster | 425/224 |
| 3,038,209 | 6/1962 | Hunter, Jr. et al. | 425/461 |
| 3,423,274 | 1/1969 | Lahm et al. | 264/348 |
| 3,423,493 | 1/1969 | Klenk et al. | 425/378 R |
| 3,456,293 | 7/1969 | De Smedt et al. | 425/66 |
| 3,502,757 | 3/1970 | Spencer | 264/169 |
| 3,734,984 | 5/1973 | Hoffman | 425/224 |
| 4,066,729 | 1/1978 | Van Cappellen | 425/224 |

Primary Examiner—Jeffery Thurlow

[57] ABSTRACT

A process improvement for preparing thermoplastic polymeric film, preferably of polyethylene terephthalate, by extruding a web in melt form onto a quench drum with a surface roughness of at least 3 microinches. In casting webs of less than about 5 mils in thickness the improvement involves drawing the melt to a melt drawdown ratio of less than about 25 and spacing the die lips from the quench roll at less than about 120 mils, preferably 20 to 80 mils. It is also preferred that the flow stability index be greater than 5.

11 Claims, 1 Drawing Sheet

VACUUM PINNING PROCESS

BACKGROUND

The subject invention relates to the extrusion of molten thermoplastic film onto a quench roll casting drum.

It is well known to produce cast film from certain thermoplastic polymers, e.g., polyethylene terephthalate (PET), which film is useful for many applications in packaging, electronics, etc. In methods for the production of such films, molten polymer is usually extruded onto the surface of a quench roll and subsequently oriented by known stretching techniques. In such methods where the film is extruded at temperatures above or near the polymer melting point, it is important to quickly cool the freshly formed film to a temperature below the second order transition temperature, i.e., that temperature at which, as temperature decreases, the polymer goes from a flexible state to a more rigid, glassy state, in order to prevent crystallization which would interfere with subsequent orientation of the film. It is, therefore, important to achieve quick, intimate contact between the extruded film and the quench roll, (referred to as "pinning") which includes preventing excess air from being trapped between the film and the roll.

In Heyer, U.S. Pat. No. 4,310,295 (Heyer 295), a vacuum pinning device is disclosed for the uniform pinning of molten web material (especially PET) onto a quench roll by means of at least two vacuum zones interacting through a baffle. The disclosure of Heyer 295 is hereby incorporated by reference.

In Heyer, U.S. Pat. No. 4,501,712 (Heyer 712), a process is disclosed for using a vacuum pinning web casting device, such as disclosed in Heyer 295, wherein the quality of a film such as PET is improved by creating a surface roughness on the quench roll of at least 3 microinches (0.08 micrometers) while simultaneously applying a vacuum force to the line of contact between the web and the roll thereby preventing excess air from being entrapped between the film and the roll. The disclosure of Heyer 712 is also incorporated herein.

As indicated in Heyer 712, a problem with using vacuum assisted film pinning devices is the avoidance of both "mottle" and "bursting". Mottle manifests itself when there is incomplete contact of the film with the quench roll surface causing a dimpled surface resembling an orange peel. Mottle is the result of too little vacuum pinning force. Bursting results when too high a vacuum force is used; the film may be drawn inward toward the vacuum source and away from the quench roll surface. The difference between these two pressures is the operating range or "window". It is advantageous from an operating standpoint to have as large a window as possible.

The process in Heyer 712 in using a roughened quench roll surface enabled one to obtain a larger operating window than a similar process using a highly polished quench roll. Unfortunately, when using the process to cast films significantly less than 5 mils (127 micrometers) in cast thickness, especially of about 3.5 mils (90 micrometers) and below, it becomes difficult if not impossible to maintain a suitably wide operating window.

SUMMARY OF THE INVENTION

It has been found that thermoplastic materials such as PET can be processed using vacuum pinning techniques within an acceptable operating window to produce cast film at thicknesses below about 5 mils (127 micrometers) in accordance with this invention which is particularly pointed out in the appended claims and described in its preferred embodiments hereinafter.

DETAILED DESCRIPTION

Figure 1:
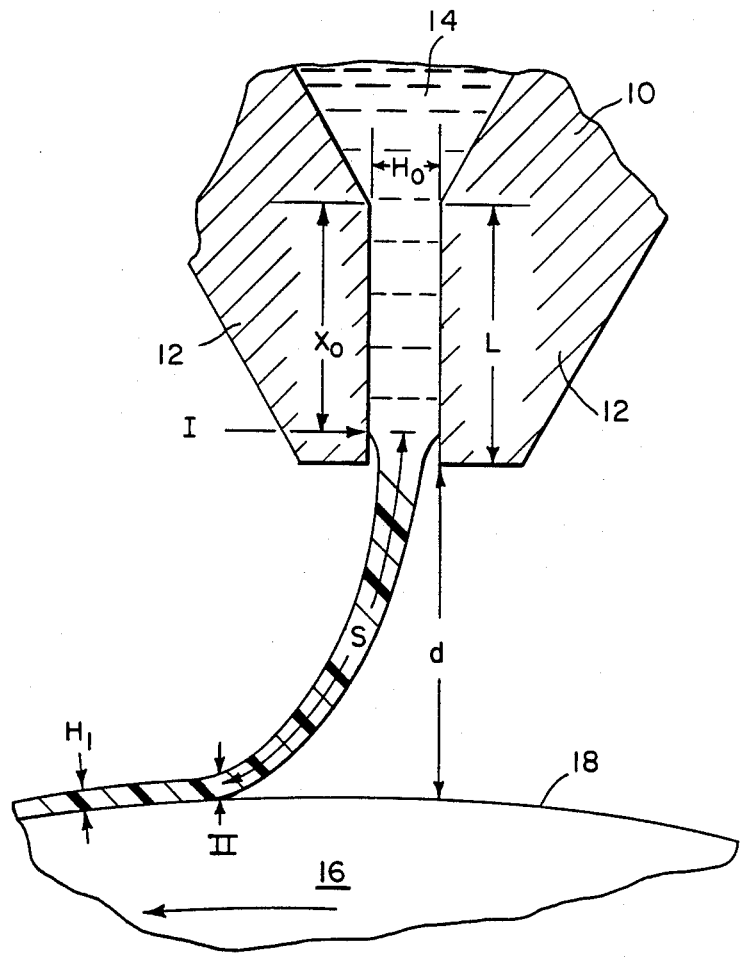
FIG. 1 is a partial cross-sectional side view of an embodiment of a device used in the process of this invention omitting the means for creating the vacuum zone.

The subject invention is a process for the preparation of thermoplastic polymeric film comprising extruding a web of said polymeric material in melt form onto a quench roll having a surface roughness of at least 3 microinches (0.08 micrometer) while simultaneously applying a vacuum force to the line of contact between the web and the roll. Preferably the surface roughness is between about 6 and 9 microinches (0.15 and 0.23 micrometers). Methods for accomplishing and measuring roughness are described in the Heyer 712 patent, which disclosure is incorporated herein.

Of the various vacuum box devices available in the art for assisting the casting of molten thermoplastic film from an extrusion die onto a quench roll, the device depicted in the figures and detailed in the disclosure of Heyer 295 is preferred for purposes of the subject invention due to the quiescent nature of the vacuum forces applied thereby to the trailing face of the film proximate the line of contact between the film and the quench roll. Of course, any other of the many vacuum devices well known in the art useful in eliminating air from the line of contact between the film and the quench roll can be employed as well in the practice of the subject invention.

Referring to the drawing the portion of the device shown is but a portion of the device depicted in Heyer 295, especially at FIG. 2. The vacuum pinning means of Heyer 295 has been omitted for the sake of clarity and simplicity; it is, however, incorporated hereby by reference.

As shown in the drawing, melt extrusion die 10 with die lips 12 containing molten plastic 14 are located above quench roll 16. It is preferred that the die be tilted back toward the quench roll, as indicated in phantom on FIG. 2 of Heyer 295, at an angle between about 15 to 25 degrees from the vertical. The die lips 12 have a vertical length of L and a die lip opening dimension $H_o$.

The spacing of the die lip opening (where the extruded film emerges) from the quench roll surface 18, measured from the rear corner of the die lip, is a distance d. In carrying out this invention, especially for PET, the spacing d should be less than about 120 mils (0.3 cm), preferably between about 20 to 80 mils (0.05 to 0.2 cm) depending upon the cast thickness desired. It is also recommended for PET that the distance d be varied in proportion to the 0.6 power of the cast film thickness $H_1$, i.e., the ratio $d/(H_1)^{0.6}$, be from about 20 to 50, preferably about 35 to 45 where d and $H_1$ are in mils.

The ratio of the die lip opening to the cast film thickness ($H_o/H_1$) is the melt drawdown ratio MDR. It is desired for PET that the MDR be less than about 25 and preferably from about 7 to 15.

In carrying out the process of vacuum pinning a melt extruded web onto a quench roll surface 18, a phenomenon called "drawback" occurs, i.e., a tendency for the molten plastic to separate from the die lips 12 (at point I) above the bottom end of the die lip opening. The dimension $X_o$ is that portion of die lip height L that the extruded melt maintains contact with both sides of die lips 12. Thus $L-X_o$ is the drawback dimension and, preferably, is a small fraction of the lip opening, $H_o$. The extruded cast film contacts the quench roll surface 18 (at point II) and thus the extruded web draw length S is the distance from drawback point I to roll contact point II. It has been estimated that there is a relationship between drawback ($L-X_o$) and processing parameters as follows:

$$L - X_o \frac{H_o^2}{d} \ln(H_o/H_1).$$

Flow instability exiting the die lips has been observed under certain casting conditions, and is estimated to occur if drawback is excessive. Accordingly, it has been found that additional processing criteria must be met to successfully produce thin cast films. It has been found that the flow stability can be estimated using the Stability Index (SI) defined as follows:

$$SI = 10^3 \times \frac{d}{VH_o^3 \ln(MDR)}$$

where

V = Peripheral drum speed (fpm) and the other dimensions are in mils.

For flow stability, it has been found that SI should be greater than 5, and preferably greater than 8.

A mathematical model of mottle and bursting thresholds has been constructed using accumulated data for PET films using a die tilted 20 degrees from the vertical and 1 to 8 microinches (0.15 to 0.20 micrometer) $R_a$ bead-blasted quench roll surface prepared as described in the Heyer 712 patent, 0.46 to 0.56 IV, and 280 to 295° C. polymer temperature:

$$DP \text{ max} = 0.00313 \frac{VH_1(\ln(H_o/H_1))^{\frac{1}{2}}}{(d + 0.0003 H_o/2)^{1.6}} C_n C_r C_t$$

$$DP \text{ min} = 0.00784 (1+d^{-\frac{1}{2}})V^{1.44} C_n K_r C_t$$

where:

DP max = maximum vacuum level or "burst" threshold ("H$_2$O)

DP min = minimum vacuum level or "mottle" threshold ("H$_2$O)

V = drum velocity (fpm)

$H_1$ = cast film thickness (mils)

$H_o$ = die lip opening (mils)

d = spacing from die lip opening-to-drum (inches)

$C_n = (1+2.9 \text{ (n}-0.53))$, where n = intrinsic viscosity $C_r = (1+0.075R)/1.525$, where R = drum roughness (microinches) $R_a$ $K_r = 3.38/(1+0.34R)$ $C_t = (1+0.023 \text{ (283}-T))$, where T = polymer temperature (°C.).

It is recommended that the upper control limit be placed at 75% of the calculated value of DP max and the lower control limit be 115% of calculated value of DP min. It is further recommended that one run at the lowest operating vacuum possible to insure against burst.

This invention can be utilized for casting any thermoplastic polymer film which is capable of being melt casted in film form. For example, such polymers include polyesters such as polyethylene terephthalate (PET), polyethylene-2,6-naphthalate, polytetramethylene-1,2-dioxybenzoate and polyethylene-1,5-naphthanate; polyamides such as polyhexamethylene adipamide, polyhexamethylene sebacamide and polycaproamide; and vinylidene chloride. While the above polymeric materials are generally crystallizable, the invention is equally applicable to those organic thermoplastic polymers which are normally amorphous and which do not crystallize, such as polystyrene and polymethyl methacrylate. The process of this invention is especially suitable for use in the melt casting of films of PET, preferably where the PET has an intrinsic viscosity (IV) of about 0.4 to 0.6 and the temperature of the melt is from about 270° to 300° C. The IV is measured as set forth in Heffelfinger, U.S. Pat. No. 3,432,591.

In accordance with this invention PET films of a casting thickness of less than 5 mils (127 micrometers) can be prepared using vacuum pinning on a roughened quench roll with a much larger operating window than using the process of the Heyer 712 patent. Indeed, films having a cast film thickness of 3.5 mils (90 micrometers) and less can be processed with a wide operating window, e.g., greater than about 50% of the bursting threshold. This has included films having a cast film thickness as low as 0.73 mil (18.5 micrometers). The cast film made by this invention is normally stretched to produce a final film of about 1/12 to 1/14 the cast film thickness useful for many applications in packaging, electronics, etc. well known to those skilled in the art.

The device of the Heyer 295 patent has been used in this invention to produce the following data:

| VACUUM PINNING OPERATING CONDITIONS | | | | | | | | | | |
|---|---|---|---|---|---|---|---|---|---|---|
| d (in.) | Vel (fpm) | $H_1$ (mls) | $H_0$ (mls) | MDR | n | Est. D'bck (mils) | DP max (H$_2$O) | Est. DP min (H$_2$O) | Oper. Range As Pct of Burst | Stab Index |
| 0.039 | 250 | 0.73 | 15 | 20.5 | 0.518 | 3.1 | 108 | 76 | 30% | 6.8 |
| 0.037 | 260 | 0.88 | 18 | 20.5 | 0.472 | 4.7 | 130 | 71 | 45% | 5.4 |
| 0.042 | 230 | 1.02 | 14 | 13.7 | 0.537 | 2.2 | 155 | 65 | 58% | 9.6 |
| 0.050 | 230 | 1.05 | 14 | 13.3 | 0.543 | 1.8 | 125 | 64 | 49% | 11.6 |
| 0.041 | 150 | 1.42 | 14 | 9.9 | 0.541 | 2.0 | 140 | 35 | 75% | 16.5 |
| 0.049 | 150 | 1.70 | 14 | 8.2 | 0.535 | 1.5 | 125 | 34 | 73% | 21.4 |
| 0.059 | 80 | 2.70 | 18 | 6.7 | 0.462 | 1.9 | 54 | 12 | 78% | 44.5 |
| 0.050 | 80 | 3.32 | 14 | 4.2 | 0.538 | 1.0 | 112 | 14 | 88% | 60.0 |

-continued

VACUUM PINNING OPERATING CONDITIONS

| d (in.) | Vel (fpm) | $H_1$ (mls) | $H_0$ (mls) | MDR | n | Est. D'bck (mils) | DP max ($H_2O$) | Est. DP min ($H_2O$) | Oper. Range As Pct of Burst | Stab Index |
| --- | --- | --- | --- | --- | --- | --- | --- | --- | --- | --- |
| 0.054 | 80 | 3.46 | 14 | 4.0 | 0.536 | 0.9 | 107 | 14 | 87% | 66.7 |

Nomenclature
VEL = Peripheral quench drum speed
d = Die lip opening-to-drum span
$H_1$ = Cast film thickness
$H_0$ = Die lip opening
MDR = Drawdown ratio ($H_0/H_1$)
D'back = Drawback (L − $X_0$) as defined above
n = Intrinsic viscosity of polymer
$R_a$ = Drum surface roughness ($R_a$) = 6.2 to 7 microinches
DP max = Calculated bursting threshold
DP min = Calculated mottle threshold

EXAMPLE

A. Polyethylene terephthalate melt is extruded at a rate of 500 pph from a 10"×0.090" slit die and cast on a rotating quench drum, with a surface finish of 6–7-in. $R_a$ obtained by bead blasting, and spaced 0.149" from the die lip opening. A vacuum pinning apparatus similar to that disclosed in Heyer 295 is used to pin the extruded web to the drum surface. At a peripheral quench drum speed of 255 fpm, giving a cast thickness of 5.1 mils, bursting threshold is found to be 105" $H_2O$. Data taken during the same test and at similar conditions suggests that the mottle threshold at 255 fpm is about 68" $H_2O$. The operating range for this control condition is therefore 37" $H_2O$.

B. Part A hereof is repeated except the rate is 300 pph, and the drum speed is 221 fpm giving a cast thickness of 3.7 mils. At this condition, bursting threshold is found to be 54" $H_2O$ and mottle threshold is found to be 50" $H_2O$. The operating range for this additional control condition is 4" $H_2O$.

C. Part A hereof is repeated except the quench drum surface finish is 7–8-in. $R_a$, the drum is spaced 0.082" from the die lip opening, the die lip opening is 15 mils, the rate is 190 pph, and the drum speed is 220 fpm giving a cast thickness of 1.07 mils. At this condition, the bursting threshold is found to be 58" $H_2O$. Data taken during the same test and at similar conditions suggests that the mottle threshold at this condition is about 52" $H_2O$. The operating range for this reduced span and die lip opening condition is thus shown to be 6" $H_2O$. This condition could not have been run at the span and die lip opening noted in Parts A and B hereof.

D. Part A hereof is repeated except the quench drum surface finish is 6–7-in $R_a$, the drum is spaced 0.039" from the die lip opening, the die lip opening is 15 mils, the rate is 176 pph, and the drum speed is 250 fpm giving a cast thickness of 0.73 mils. At this condition, the bursting threshold is found to be 108" $H_2O$. Data taken during the same test and at similar conditions suggests that the mottle threshold at this condition is about 72" $H_2O$. The operating range is shown to be 36" $H_2O$. The casting process was stable. This condition could not have been run at the conditions noted in Parts A, B and C hereof.

I claim:

1. In a process for preparing thermoplastic polymeric film comprising extruding a web of polymeric material in melt form from an extrusion die lip opening and casting the web onto the surface of a quench roll having a surface roughness of at least three microinches (0.08 micrometer) using pinning techniques, the improvement in casting webs of less than about 5 mils (127 micrometers) in thickness by drawing the melt to a melt drawdown ratio of less than about 25 and spacing the extrusion die lip opening from the quench roll surface at less than about 120 mils (3 mm).

2. The process of claim 1 wherein the thermoplastic polymer is polyethylene terephthalate having an intrinsic viscosity of about 0.4 to 0.6 and the temperature of the melt is from 270° to 300° C., and the stability index is greater than 5.

3. The process of claim 2 wherein the drum surface roughness is between about 6 to 9 microinches (0.15 to 0.23 micrometers).

4. The process of claim 2 wherein the spacing of the die lip opening from the quench roll surface is between about 20 to 80 mils (0.5 to 2 mm).

5. The process of claim 2 wherein the ratio of the spacing of the die lip opening from the quench roll surface to the 0.6 power of the cast web thickness is between about 20 to 50.

6. The process of claim 2 wherein the operating pressure range between the bursting threshold and the mottle threshold of the cast film is at least about 50 percent of the bursting threshold.

7. The process of claim 2 wherein the linear speed of the quench roll surface is from 50 to 330 feet per minute (15 to 100 meters per minute).

8. The process of claim 2 in casting webs of less than about 3.5 mils (90 micrometers) in thickness wherein the drum surface roughness is from 6 to 9 microinches (0.15 to 0.23 micrometers), the spacing of the die lip opening from the quench roll surface is from 20 to 80 mils (0.5 to 2 mm), the ratio of said spacing to the 0.6 power of the cast web thickness is from about 35 to 45, the operating pressure range between the bursting threshold and the mottle threshold of the cast film is at least about 50 percent of the bursting threshold, and the stability index is greater than 8.

9. The process of claim 8 wherein the linear speed of the quench roll surface is from 50 to 330 feet per minute (15 to 100 meters per minute).

10. The process of claim 8 wherein the die is tilted back toward the quench roll at an angle between about 15 and 25 degrees from the vertical.

11. The process of claim 8 wherein the melt drawdown ratio is between about 7 and 15.

* * * * *